United States Patent
Polach et al.

(10) Patent No.: US 6,333,586 B1
(45) Date of Patent: Dec. 25, 2001

(54) VALVE FOR CONTROLLING FLUIDS

(75) Inventors: Wilhelm Polach, Moeglingen; Friedrich Boecking, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,542

(22) PCT Filed: Mar. 11, 1999

(86) PCT No.: PCT/DE99/00662

§ 371 Date: Feb. 14, 2000

§ 102(e) Date: Feb. 14, 2000

(87) PCT Pub. No.: WO99/66197

PCT Pub. Date: Dec. 23, 1999

(30) Foreign Application Priority Data

Jun. 12, 1998 (DE) ............................................. 198 26 339

(51) Int. Cl.⁷ ...................................................... H01L 41/04
(52) U.S. Cl. ............................................. 310/328; 310/346
(58) Field of Search .............................. 310/328; 71/346

(56) References Cited

U.S. PATENT DOCUMENTS 4,933,591 * 6/1990 Stahlhuth ............................ 310/328
5,402,159 * 3/1995 Takahashi et al. ....................... 347/9

FOREIGN PATENT DOCUMENTS

2417450A1 * 10/1975 (DE).

OTHER PUBLICATIONS

Derwent english abstract of admitted art DE 196 19 319 (Ufermann).*
Derwent english abstract of DT 2417450A1 (Hamburger).*

* cited by examiner

Primary Examiner—Brian Sircus
Assistant Examiner—Michael C. Zarroli
(74) Attorney, Agent, or Firm—Ronald E. Greigg

(57) ABSTRACT

A valve for controlling fluids in which the valve is actuatable by a piezoelectric actuator that acts directly on a valve member of the control valve. To compensate for changes in length of different magnitudes resulting from temperature factors, a Peltier element is incorporated into the heat flow from the piezoelectric actuator to a heat-dissipating part of the housing, and the Peltier element is triggered by an electric control unit in such a way that temperature-dictated changes in length of the piezoelectric actuator are at least partly compensated for compared with those of the housing receiving the piezoelectric actuator.

21 Claims, 3 Drawing Sheets

VALVE FOR CONTROLLING FLUIDS

PRIOR ART

The invention is based on a valve for controlling fluids as generically defined hereinafter. In one such valve, known from European Patent Disclosure EP A 0 371 469, the actuation of the valve member is accomplished by a piezoelectric actuator, by the provision of a hydraulic chamber between the piezoelectric actuator and the valve member, by way of which chamber tolerances can be to compensated for. Such valves have the disadvantage that care must be taken to assure that the hydraulic chamber is always adequately filled with adjusting fluid. Furnishing a hydraulic chamber also means major expense for sealing the chamber off. If conversely the valve for controlling fluids is to be actuated directly by a piezoelectric actuator, then problems arise from the fact that the work of a piezoelectric actuator, because of a supply of current to it, produces considerable heat. The heat leads to changes in a length of the piezoelectric actuator itself and to thermal expansions of the housing that surrounds the piezoelectric actuator and heats the piezoelectric acuator. Over the course of operation of such a valve, it can thus happen that because of the different thermal expansions, the valve can no longer reach its closing position or a defined position.

ADVANTAGES OF THE INVENTION

The valve according to the invention for controlling fluids has an advantage over the prior art that a simple valve can be furnished which is actuated directly by the piezoelectric actuator; by the compensating elements provided, temperature-dictated changes in length of the piezoelectric actuator are substantially compensated for compared to those of the housing receiving the piezoelectric actuator. Advantageously, this is achieved by incorporating a Peltier element, which is triggered by an electric control unit in such a way that temperature-dictated changes in length of the piezoelectric actuator are at least partly compensated for compared with those changes in the housing that receives the piezoelectric actuator, into the heat flow from the piezoelectric actuator to a heat-dissipating part of the housing. Depending upon how electrical current is supplied, such a Peltier element can effect either cooling or heating in a known manner at the intended installation location and can thus counteract undesired changes of length, especially those in the actuating direction of the piezoelectric actuator, because either heat is supplied or heat is dissipated, depending on the state of operation or the construction specifications.

Advantageously, compensation is accomplished by using compensating elements whose material has a different coefficient of thermal expansion from that of the surrounding materials. A material with a high coefficient of thermal expansion has the advantage that by means of heating and/or cooling by the Peltier element, relatively large compensating changes in length in the actuating direction of the piezoelectric actuator are attained, which can absorb the large changes in length resulting in the region of heat development of the piezoelectric stack that is in operation, and thus a compensation for these changes in length is achieved compared to the lesser changes in length in the surrounding housing because of the lesser heat flow density there.

The heating or cooling of the compensating elements can be done by means of an axially or radially adjoining Peltier element. In the latter version, the advantages are a smaller axial installation space required and a larger contacting surface area between the compensating elements and Peltier element and the heat-absorbing housing that furnishes a heat sink. The heat outflow from the piezoelectric element to the heat sink can advantageously be improved by interposing the cup-shaped housing as set forth hereinafter, so as to achieve the least possible temperature dependency of the actuating stroke of the piezoelectric actuator.

BRIEF DESCRIPTION OF THE DRAWINGS

One exemplary embodiment of the invention is shown in the drawings and described in further detail below.

DESCRIPTION OF THE PREFERRED EMBODIMENT

Figure 1:
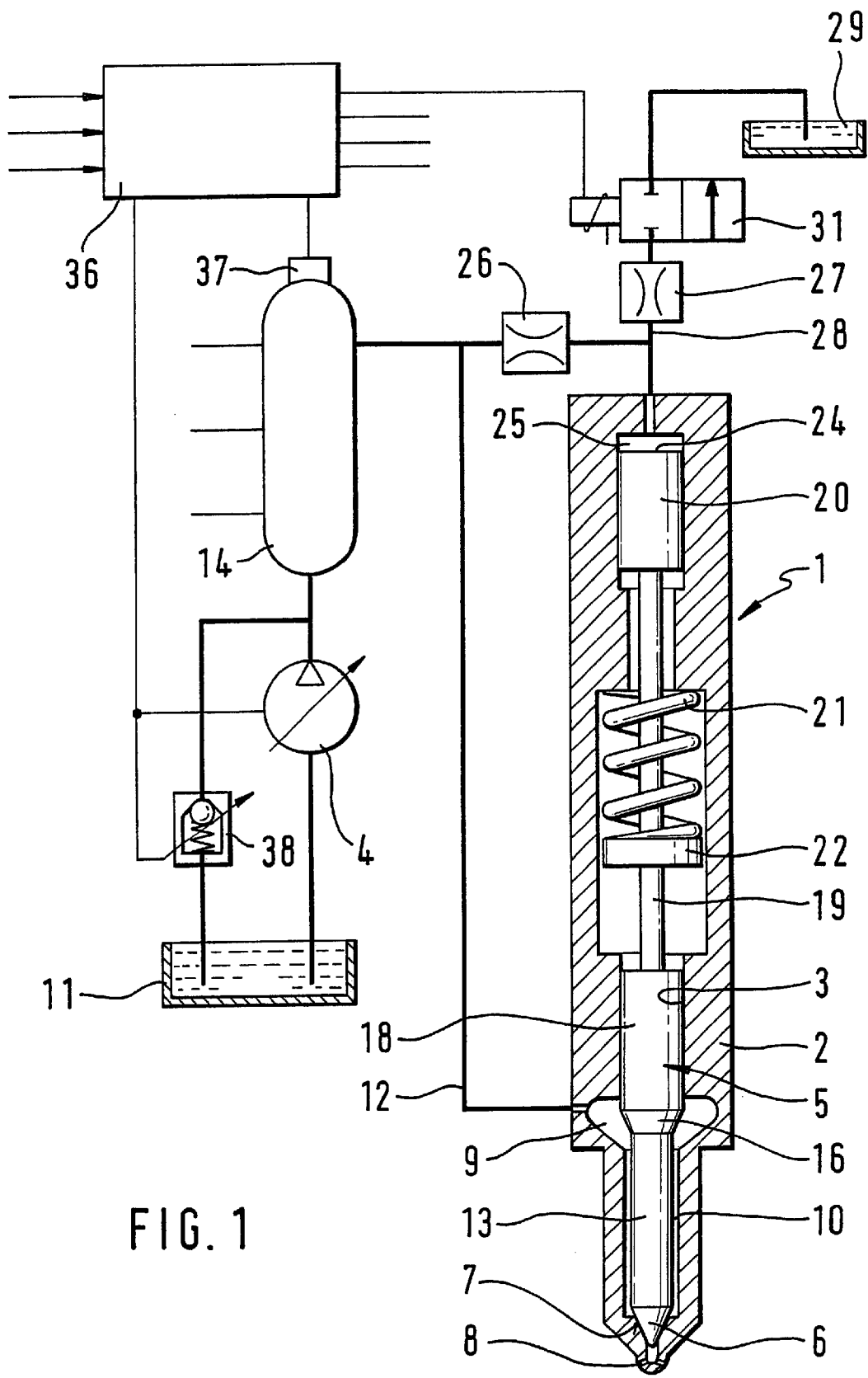
FIG. 1 shows a schematic illustration of a fuel injection valve, in which the valve according to the invention for controlling fluids can be employed.

FIG. 1 is a simplified illustration of a fuel injection valve 1, which has an injection valve housing 2 with a stepped bore 3, in which an injection valve member 5 is guided. This valve member has a conical sealing face 6 on one end, which cooperates with a conical valve seat 7 on the end of the stepped bore 3. Downstream of the valve seat, there are fuel injection openings 8, which are disconnected from a pressure chamber 9 when the sealing face 6 is placed on the valve seat 7. The pressure chamber extends via an annular chamber 10, formed around the smaller-diameter part 13 of the injection valve member 5 adjoining the sealing face 6 upstream, as far as the valve seat 7. Via a pressure line 12, the pressure chamber 9 communicates with a high-pressure fuel source in the form of a high-pressure fuel reservoir 14, which is supplied with fuel, brought to injection pressure, from a tank 11, for example by a high-pressure pump 4 that pumps at a variable pumping rate. The high-pressure fuel reservoir supplies a plurality of the injection valves shown. In the region of the pressure chamber 9, the smaller-diameter part 13 of the injection valve member changes over, at a pressure shoulder 16 pointing toward the valve seat 7, into a larger-diameter part 18 of the injection valve member. This part is guided tightly in the stepped bore 3 and continues, on the side remote from the pressure shoulder 16, in an intermediate part 19 until the intermediate part reaches a piston-like end 20 of the injection valve member. In the region of the intermediate part 19, this part has a spring plate 22, and a compression spring 21 that urges the fuel injection valve in the closing direction the compression spring is fastened between the spring plate and the housing 2 of the fuel injection valve.

The piston-like end 20, with a face end 24 whose surface area is greater than that of the pressure shoulder 16, defines a control chamber 25 in the housing 2 of the fuel injection valve; via a first throttle 26, this control chamber communicates constantly with the high-pressure fuel reservoir 14, and via a second throttle 27, disposed in an outflow conduit 28, this chamber communicates with a relief chamber 29.

The flow through the outflow conduit 28 is controlled by a control valve 31, embodied as a 2/2-way valve, in such a way that the outflow conduit is either opened or closed.

The triggering of the control valve 31 serves to control the injection quantity and the instant of injection of fuel into the combustion chambers of an associated internal combustion engine, in particular a diesel engine. When the control valve is closed, because of the constant communication of the control chamber 25 with the high-pressure fuel reservoir, the pressure prevailing there is at a high level. Because the surface area of the face end 24 is greater than the surface area of the pressure shoulder 16, and the pressure acting on both of these faces is of equal magnitude at this moment, there is a resultant force, reinforced by the compression spring 21, that keeps the fuel injection valve member 5 in the closed position. If the control valve 31 is opened in order to trip an injection, then the control chamber 25 can be relieved to the relief chamber 29, so that being decoupled from the high-pressure fuel reservoir by the first throttle 26, a pressure at a lower level is established in the control chamber 25. In this case, the compressive forces acting in the opening direction on the pressure shoulder 16 predominate, and the fuel injection valve is opened for injection, whereby the instant of injection and the injection onset are defined. By re-closure of the control valve 31, the original high-fuel pressure is very quickly reestablished in the control chamber 25, since the fuel can continue to flow in via the first throttle 26. As a result, the fuel injection valve member 5 returns to its outset or closing position to terminate the high-pressure injection.

The triggering of the fuel injection valve is effected via a control unit 36, which as a function of operating parameter triggers the control valves 31 of the individual fuel injection valves, and which with a pressure sensor 37 also detects the pressure in the high-pressure fuel reservoir and controls the variably pumping high-pressure fuel pump 4 as a function of the deviation from a desired set-point value. Parallel to this pump, a pressure limiting valve 38 can be provided, which is also triggerable as a pressure control valve as a function of operating parameters, depending on the design of the high-pressure fuel quantity delivery. The high-pressure fuel pump can also pump the same quantity constantly, and via the pressure limiting valve, which in this case should explicitly be considered to be a pressure control valve, the pressure in the high-pressure fuel reservoir 14 can be regulated.

Figure 2:
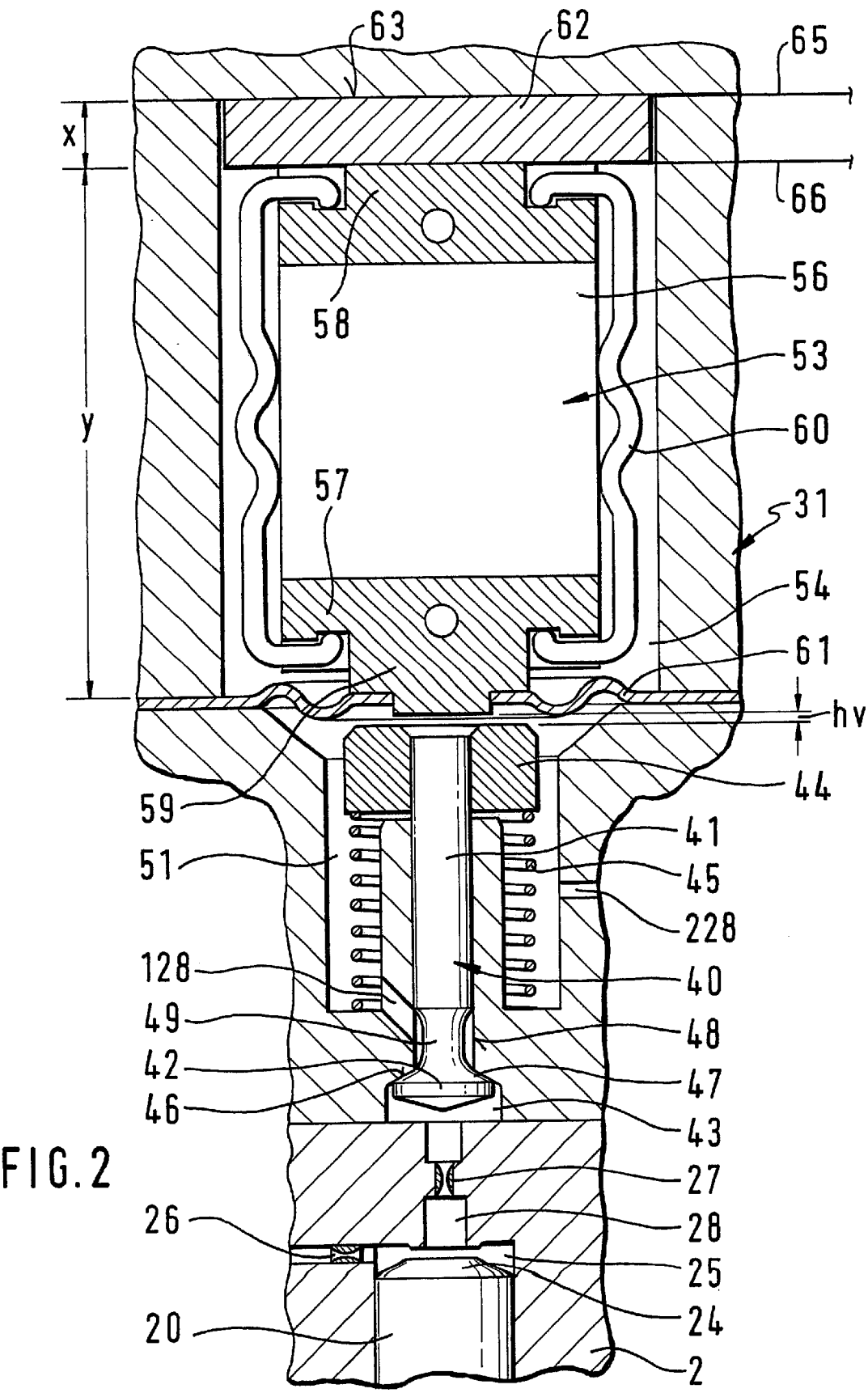
FIG. 2 is a simplified illustration of a first version of the valve of the invention.

The valve according to the invention for controlling fluids can be used as a control valve 31. In FIG. 2, part of the fuel injection valve of FIG. 1 is shown, along with the injection valve housing 2, in which the control valve 31 is also integrated, and along with the control chamber 25, which is enclosed in the housing by the face end 24 of the piston-like end 20. The inflow to the control chamber 25 is effected via the first throttle 26, and the outflow is effected via the outflow conduit 28, in which the second throttle 27 is seated.

The control valve has a valve member 40, with a shaft 41 and a valve head 42 that protrudes into a valve chamber 43. On the end of the shaft 41 remote from the valve head, a spring plate 44 is provided, on which a compression spring 45 rests, which on the other end is braced against the housing and seeks to keep the valve member in the closing position. This is accomplished by the contact of a sealing face 47, provided on the valve head, with a conical seat 46, which is located at the transition between the valve chamber 43 and a guide bore 48 of the adjoining shaft 41. Adjacent to the sealing face 47, the shaft has an annular recess 49, which makes it possible, when the valve head 42 is lifted from the valve seat 46, for the valve chamber 43 to communicate with a portion of the outflow conduit 128 that branches off from the guide bore 48. This outflow conduit discharges into a spring chamber 51, which receives the compression spring and the end, protruding from the guide bore 48, of the shaft 41 along with the spring plate 46, and from which a line 228 leads to the relief chamber 29. By means of the compression spring 45, the valve member 40 is normally kept in the closing position, so that the valve chamber 43 and the control chamber 25 are closed on the outflow side, and the high pressure of the high-pressure fuel reservoir can build up in the control chamber 25 in order to close the fuel injection valve member.

An actuation of the valve member 40 in the opening direction is accomplished by means of the aforementioned piezoelectric actuator 53. The piezoelectric actuator comprises a piezoelectric element in the form of a piezoelectric stack 56, which is enclosed in axial terms by a bottom disk 57 and a top disk 58; as the actuating part, the bottom disk 57, with a piston like end 59, can be made to contact the shaft 41. Since piezoelectric components can be stressed permanently and reliably only for pressure, the piezoelectric stack is prestressed by spring element 60. The supply of electricity to the piezoelectric stack is not shown in the drawing and is accomplished in the usual way. The actuator, thus formed of the piezoelectric stack, bottom disk 57, top disk 58, and spring elements 60, is tightly enclosed in an actuator chamber 54 by a resilient diaphragm element 61. The diaphragm element 61 closes the actuator chamber 54 off from the spring chamber 51 and also keeps the actuator, with its top disk 58, in contact with a Peltier element 62. The Peltier element rests with flat faces on one side on the top disk 58 and on the other on the housing wall 63 pointing in the axial direction of the valve member 40, and it has electric lead lines 65 and 66 for current flows controlled by the control unit.

As a result, if heat develops in the piezoelectric stack, there is a good outflow of heat between the top disk 58 and the Peltier element 62, and between the Peltier element and the housing wall of the injection valve housing 2. When voltage is supplied to the piezoelectric stack, the piezoelectric actuator lengthens, displacing the valve member 40 in the opening direction, which returns to its closing position upon retraction of the excitation of the piezoelectric stack by the force of the compression spring 45 and the attendant reduction in length of the piezoelectric stack. These operating events of the piezoelectric stack create heat, which lead to expansion of material, taking into account the applicable coefficients of thermal expansion for the various materials. Despite good heat dissipation, the temperature in the region of the piezoelectric actuator, which as a heat source has a high-heat flow stress, will become greater during operation of the fuel injection valve than the temperature of the housing surrounding the actuator chamber 54, the housing having a lesser heat flow stress. With increasing time in operation, the piezoelectric actuator would accordingly increase in length compared with the specified length of the housing into which it is installed, and could affect the position of the valve member 40. To allow the valve member 40 to regularly return to its closing position, a prestroke hv is provided here first, which the piston-like end 59 must cover in order to attain contact with the valve member. This prestroke can partly absorb the aforementioned temperature-dictated differences in length, so that the mode of operation of the control valve is unaffected thereby. In addition, however, the Peltier element also offers a further capability of compensating for differences in length, because when controlled actively it has influence on the temperature of the piezoelectric actuator. In a known manner, depending on the current flow direction through a Peltier element, a temperature drop (cooling) or a temperature increase can be accomplished. These elements are therefore also known as electric semiconductor heat pumps. With a regulated supply and/or dissipation of heat, the temperature of the piezoelectric actuator can be regulated within limits. Depending on the structural specification of the length of the piezoelectric actuator in relation of the valve to be actuated, the spacing of the piezoelectric actuator from this valve can be kept constant by heating or cooling.

Figure 3:
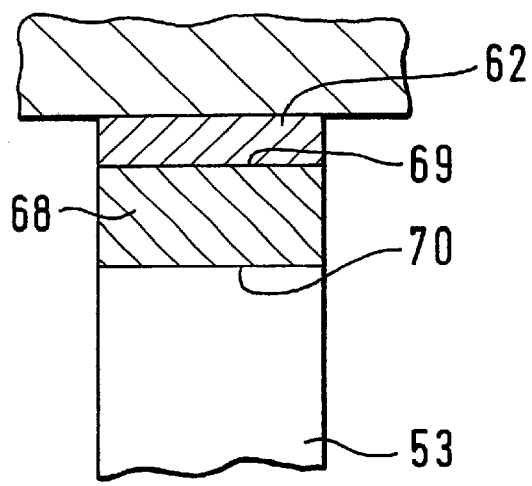
FIG. 3 shows a second version of the invention using compensating elements.

To reinforce the action of the Peltier element, a compensating element 68 can be provided in accordance with FIG. 3 between the piezoelectric actuator and the Peltier element in the direction of a change of length of the piezoelectric actuator 53, or in its actuating direction; the compensating element, with its flat face ends 69, 70, rests flush on the piezoelectric actuator 53 and the Peltier element 62, respectively, so that good heat flow is assured. The compensating element has a particularly high coefficient of thermal expansion. By variably heating or cooling via the Peltier element 62, it is possible with this high coefficient of thermal expansion to compensate for a major change in length of the piezoelectric actuator 53. For example, when the engine or the valve is not yet at operating temperature, if the Peltier element is heated, then the piezoelectric actuator at the beginning of operation assumes an intended working position relative to the shaft 41 of the valve member 40. As the heating increases, the compensating elements 68 can then be cooled, which leads to a loss in terms of a change of length, which compensates for the increase in terms of change in length of the piezoelectric actuator.

Figure 4:
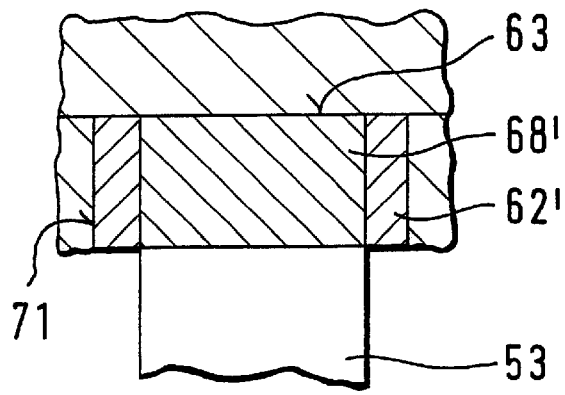
FIG. 4 shows a third exemplary embodiment of the invention, with a Peltier element resting circumferentially on the compensating elements of FIG. 3.

In an alternative version shown in FIG. 4, however, the compensating elements 68 can also be brought into direct contact with the adjacent housing wall 63. In this case, the Peltier element 62' is disposed circumferentially on the compensating elements 68', thus forming a large heat-contact area. On the other hand, the annular Peltier element is then in good thermal contact with the annularly surrounding wall 71 of the housing. Because of the large heat-introducing cross section, this wall makes it possible for the heat, which must be passed from the piezoelectric actuator 53 to the environment, to be dissipated quickly. This wall communicates with corresponding heat sinks, which can either be coolant fluid or cooling faces.

Figure 5:
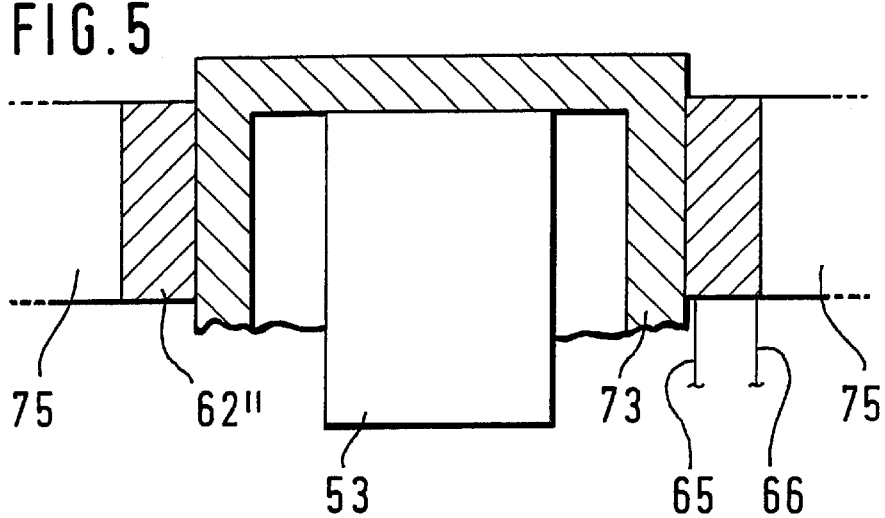
FIG. 5 shows a fourth exemplary embodiment of the invention, with a piezoelectric actuator supported in a cup-shaped housing part.

In a third version, which is shown in FIG. 5, the location of the piezoelectric actuator 53 in a cup-shaped housing part 73 can be fixed geometrically. This housing part offers a large heat-dissipating cross section, and its outer jacket or sidewall surface communicates circumferentially, via a Peltier element 62", with the cooled housing or with special cooling bodies 75. Once again, exact positioning of the piezoelectric actuator is accomplished. By the heat flow via the cup-shaped housing part, the piezoelectric actuator is already partially cooled, and with the support of the Peltier element 62', it undergoes a compensation in length. Furthermore, the cup-shaped housing part can itself be operative as a compensating element, analogous the version of FIG. 4. The version of FIG. 5 offers a still further improved heat flow compared with that of FIG. 4, because larger dissipating surface areas and larger areas of heat contact with the Peltier element 62" are available.

In the construction presented here of a valve for controlling fluids, a piezoelectric actuator can be used in a simple way; a piezoelectric actuator has the advantage of exactly controllable opening strokes and also opening instants with respect to the opening travel. To that end, it offers the major advantage of allowing the realization of high switching speeds, which are capable of controlling even small preinjection quantities by means of brief and/or slight relief of the control chamber.

The foregoing relates to a preferred exemplary embodiment of the invention, it being understood that other variants and embodiments thereof are possible within the spirit and scope of the invention, the latter being defined by the appended claims.

We claim:

1. A valve for controlling fluids, comprising a piezoelectric actuator (53), a valve member (40) which is actuatable at least indirectly, counter to a restoring force, by said piezoelectric actuator (53) which has a piezoelectric element (56) that is supported by one face end (58) in a housing (2) and that upon a change in a voltage applied to the piezoelectric element undergoes a change of length that can be transmitted by means of another face end (57) of the piezoelectric actuator to the valve member (40) in order to adjust the latter, in a heat flow from the piezoelectric actuator (53) to a heat-dissipating part of the housing, a Peltier element (62) is incorporated, which is triggered by an electric control unit (36) in such a way that temperature-dictated changes in length of the piezoelectric actuator (53) are at least partly compensated for compared with those changes in the housing (2) that receives the piezoelectric actuator.

2. The valve according to claim 1, in which the piezoelectric element (56) is retained on the adjacent housing by a retaining means (61) that absorbs changes in length, and the Peltier element (62) is inserted between the first face end (58) of the piezoelectric element (56) and the housing adjacent to the piezoelectric element (56).

3. The valve according to claim 2, in which the retaining means is a resiliently yielding element.

4. The valve according to claim 1, in which a compensating element (68), whose material has a high coefficient of thermal expansion, is disposed between the piezoelectric element (56) and the Peltier element (62) in a direction of longitudinal expansion of the piezoelectric element.

5. The valve according to claim 2, in which a compensating element (68), whose material has a high coefficient of thermal expansion, is disposed between the piezoelectric element (56) and the Peltier element (62) in a direction of longitudinal expansion of the piezoelectric element.

6. The valve according to claim 3, in which a compensating element (68), whose material has a high coefficient of thermal expansion, is disposed between the piezoelectric element (56) and the Peltier element (62) in a direction of longitudinal expansion of the piezoelectric element.

7. The valve according to claim 4, in which the Peltier element (62) and the compensating element (68) coaxially adjoins the piezoelectric element.

8. The valve according to claim 5, in which the Peltier element (62) and the compensating element (68) coaxially adjoins the piezoelectric element.

9. The valve according to claim 6, in which the Peltier element (62) and the compensating element (68) coaxially adjoins the piezoelectric element.

10. The valve according to claim 4, in which the compensating element (68') coaxially adjoins the piezoelectric element (56), and the Peltier element (62') is disposed, surrounding the compensating element (68'), between the compensating element and a circumferential wall of the housing.

11. The valve according to claim 5, in which the compensating element (68') coaxially adjoins the piezoelectric element (56), and the Peltier element (62') is disposed, surrounding the compensating elements (68'), between the compensating element and a circumferential wall of the housing.

12. The valve according to claim 6, in which the compensating element (68') coaxially adjoins the piezoelectric element (56), and the Peltier element (62') is disposed, surrounding the compensating element (68'), between the compensating element and a circumferential wall of the housing.

13. The valve according to claim 4, in which the piezoelectric element (56) is supported in a cup-shaped housing part (73), and the Peltier element (62") is inserted into a heat dissipation path between the cup-shaped housing sidewall and the housing, oriented radially outward from the longitudinal axis of the piezoelectric element (56), from the cup-shaped part (73) to heat sinks (75) of the housing.

14. The valve according to claim 5, in which the piezoelectric element (56) is supported in a cup-shaped housing part (73), and the Peltier element (62") is inserted into a heat dissipation path between the cup-shaped housing sidewall and the housing, oriented radially outward from the longitudinal axis of the piezoelectric element (56), from the cup-shaped part (73) to heat sinks (75) of the housing.

15. The valve according to claim 6, in which the piezoelectric element (56) is supported in a cup-shaped housing part (73), and the Peltier element (62") is inserted into a heat dissipation path between the cup-shaped housing sidewall and the housing, oriented radially outward from the longitudinal axis of the piezoelectric element (56), from the cup-shaped part (73) to heat sinks (75) of the housing.

16. The valve according to claim 1, in which the valve member (40), in the closing position at a least length of the piezoelectric element (56) resulting from the electric triggering has a prestroke (hv) from a part of the piezoelectric actuator (53) that effects the adjustment of the valve member (40).

17. The valve according to claim 2, in which the valve member (40), in the closing position at a least length of the piezoelectric element (56) resulting from the electric triggering has a predetermined spacing (hv) from a part of the piezoelectric actuator (53) that effects the adjustment of the valve member (40).

18. The valve according to claim 3, in which the valve member (40), in the closing position at a least length of the piezoelectric element (56) resulting from the electric triggering has a predetermined spacing (hv) from a part of the piezoelectric actuator (53) that effects the adjustment of the valve member (40).

19. The valve according to claim 1, in which the valve member (40) in the closing position has a prestroke (hv) from a part of the piezoelectric actuator (53) that affects the adjustment of the valve member (40), said prestroke (hv) being provided by a least length of the piezoelectric element (56) resulting from the electric triggering.

20. The valve according to claim 2, in which the valve member (40) in the closing position has a prestroke (hv) from a part of the piezoelectric actuator (53) that affects the adjustment of the valve member (40), said prestroke (hv) being provided by the shortest longitudinal extent of the piezoelectric element (56) resulting from the electric triggering.

21. The valve according to claim 3, in which the valve member (40) in the closing position has a prestroke (hv) from a part of the piezoelectric actuator (53) that affects the adjustment of the valve member (40), said prestroke (hv) being provided by the shortest longitudinal extend of the piezoelectric element (56) resulting from the electric triggering.

* * * * *